(12) United States Patent
Yamada et al.

(10) Patent No.: US 11,226,779 B2
(45) Date of Patent: Jan. 18, 2022

(54) PRINTING SYSTEM AND CONTROL METHOD

(71) Applicant: CANON KABUSHIKI KAISHA, Tokyo (JP)

(72) Inventors: Koji Yamada, Yokohama (JP); Yu Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/383,410

(22) Filed: Apr. 12, 2019

(65) Prior Publication Data

US 2019/0317703 A1    Oct. 17, 2019

(30) Foreign Application Priority Data

Apr. 16, 2018 (JP) .............................. JP2018-078711

(51) Int. Cl.
| | |
|---|---|
| *G06F 15/00* | (2006.01) |
| *G06F 3/12* | (2006.01) |
| *G10L 15/08* | (2006.01) |
| *G10L 15/28* | (2013.01) |
| *G06K 15/02* | (2006.01) |

(52) U.S. Cl.
CPC ............ *G06F 3/1203* (2013.01); *G06F 3/122* (2013.01); *G06F 3/1278* (2013.01); *G06K 15/1848* (2013.01); *G10L 15/083* (2013.01); *G10L 15/28* (2013.01)

(58) Field of Classification Search
CPC ... G06F 3/1203; G06F 3/122; G06K 15/1848; G10L 15/083; G10L 15/28
USPC .......................................................... 358/1.15
See application file for complete search history.

(56) References Cited

U.S. PATENT DOCUMENTS

| | | | | |
|---|---|---|---|---|
| 2003/0069069 A1* | 4/2003 | Kinjo | ...................... | A63F 13/02 463/30 |
| 2013/0077125 A1* | 3/2013 | Kitagata | ............... | G06F 3/1204 358/1.14 |
| 2014/0248929 A1* | 9/2014 | Noonan | .................. | H04L 9/001 463/9 |
| 2014/0376040 A1* | 12/2014 | Shiratori | ............... | G06F 3/1207 358/1.15 |
| 2015/0199310 A1* | 7/2015 | Nakazawa | .............. | G06F 40/14 709/203 |

FOREIGN PATENT DOCUMENTS

| | | |
|---|---|---|
| JP | 2003-099232 A | 4/2003 |
| JP | 2007-202763 A | 8/2007 |
| JP | 2009230467 A | 10/2009 |

* cited by examiner

*Primary Examiner* — Mark R Milia
(74) *Attorney, Agent, or Firm* — Canon U.S.A., Inc. IP Division

(57) ABSTRACT

A relay apparatus transmits information corresponding to a registered photograph to the print management apparatus based on an event being specified when the first option is selected, wherein the event that is specified is registration of the photograph in the Web service, and transmits an instruction to print the game contents to the print management apparatus when the second option is selected and a speech instruction in a predetermined phrase spoken toward the speech recognition terminal is specified.

11 Claims, 21 Drawing Sheets

FIG. 16

Number Place

QUESTION LEVEL: EASY

| 7 |   | 2 | 5 |   | 6 |   |   | 4 |
|---|---|---|---|---|---|---|---|---|
|   | 4 | 5 | 3 |   |   | 7 | 9 | 8 |
| 6 | 3 |   |   | 1 |   | 7 |   | 2 |
| 4 |   |   |   | 5 |   |   | 6 | 3 |
|   |   |   | 6 | 7 | 4 |   |   |   |
| 9 | 5 |   |   | 3 |   |   |   | 7 |
| 3 |   | 7 |   | 9 |   |   | 4 | 5 |
|   | 6 | 9 | 1 |   | 3 | 2 | 7 |   |
| 8 |   |   | 7 |   | 5 | 1 |   | 9 |

*FIG. 17*

| LANGUAGE | FONT NAME | CHARACTER STRING 1 TO BE USED |
|---|---|---|
| JAPANESE | JAPANESE FONT 01 | やさしい |
| ENGLISH | Font_01 | Easy |
| GERMAN | Font_03 | Leicht |
| FRENCH | Font_10 | Simple |

FIG. 18

LIST OF PROCESSING SETS (1)
PRINT WHEN IMAGE WITH "#print" IS POSTED IN ○○ Web SERVICE.

(2)     SPEECH RECOGNITION TERMINAL A
PRINT Number Place WHEN YOU SAY "PRINT Number Place".

(3)     SPEECH RECOGNITION TERMINAL B
PRINT Number Place WHEN YOU SAY "PRINT Number Place".

(4)     SPEECH RECOGNITION TERMINAL A
PRINT to do LIST WHEN YOU SAY "PRINT to do LIST".

(5)     SPEECH RECOGNITION TERMINAL B
PRINT to do LIST WHEN YOU SAY "PRINT to do LIST".

(6)
ORDER INK WHEN REMAINING INK OF PRINTER REDUCES.

PRINTING SYSTEM AND CONTROL METHOD

BACKGROUND OF THE INVENTION

Field of the Invention

The present invention relates to a printing system and a control method.

Description of the Related Art

There has been conventionally disclosed a technique for generating print data by use of an application and a printer driver in an information processing apparatus when a user instructs a printing apparatus to print in Japanese Patent Laid-Open No. 2009-230467.

In Japanese Patent Laid-Open No. 2009-230467, however, various operations of searching user-desired contents and activating the application and the printer driver are required, and a further reduction in operation loads is not considered.

SUMMARY OF THE INVENTION

Embodiments of the present invention provide a printing system configured of a relay apparatus, an information processing apparatus, a print management apparatus, and a printing apparatus, in which the relay apparatus includes a display unit configured to display a setting screen including at least a first option to perform a print processing when a photograph is registered in a Web service and a second option to print game contents in response to a speech instruction in a predetermined phrase toward a speech recognition terminal, the options being such that a processing as a trigger is integral with an execution processing performed when the processing as a trigger is caused, a first transmission unit configured to transmit data storing place information corresponding to a posted photograph to the print management apparatus when the first option is selected and the photograph registered in the Web service is specified, and a second transmission unit configured to transmit an instruction to print the game contents to the print management apparatus when the second option is selected and a speech instruction in a predetermined phrase spoken toward the speech recognition terminal is specified, the print management apparatus includes a generation unit configured to acquire data corresponding to the photograph by use of the storing place information and to generate print data when receiving the storing place information, and to generate print data on the basis of the game contents when receiving the instruction to print the game contents, and the printing apparatus includes a print unit configured to acquire the generated print data and to perform a print processing.

Further features of the present invention will become apparent from the following description of exemplary embodiments (with reference to the attached drawings).

BRIEF DESCRIPTION OF THE DRAWINGS

FIG. 16 illustrates exemplary print data of Number Place.

FIG. 17 illustrates a language table of a print management service.

FIG. 18 is a diagram illustrating an exemplary screen of a list of processing sets.

DESCRIPTION OF THE EMBODIMENTS

Embodiments of the present invention will be described below in detail with reference to the accompanying drawings.

First Embodiment

A configuration of a service-associated printing system on which embodiments of the present invention are based will be first described.

Figure 1:
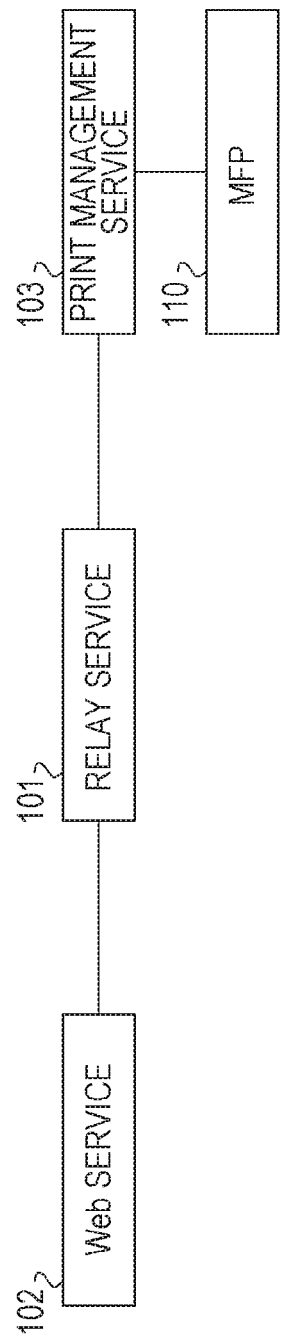
FIG. 1 is a block diagram illustrating an exemplary configuration of a service-associated printing system.

FIG. 1 is a block diagram illustrating an exemplary configuration of a network system according to the present embodiment. In the network system illustrated in FIG. 1, a relay service 101 capable of associating a plurality of Web services and a Web service 102 capable of transmitting data in a predetermined trigger format to the relay service 101 are connected via Internet. Further, a print management service 103 capable of receiving data in a predetermined action format from the relay service 101 is connected to the relay service 101 via Internet. The predetermined trigger format and the predetermined action format herein are previously defined by the relay service 101. The Web service 102 and the print management service 103 prepare an interface capable of exchanging data in the formats. With the above system configuration, for example, even if the Web service 102 and the print management service 103 cannot directly exchange data, services can be associated via the relay service 101. The Web service 102, the relay service 101, and the print management service 103 are provided by servers (or a group of servers) prepared by the providers of the services, respectively. That is, a server which provides the Web service 102 and a server which provides the relay service 101 are communicably connected. Further, the server which provides the relay service 101 and a server which provides the print management service 103 are communicably connected. Further, a print management server and a printing apparatus are communicably connected. Each server may be simply denoted as information processing apparatus.

The print management service 103 is connected with a multifunction printer (denoted as MFP below) 110 via Internet, and is capable of instructing it to print via Internet from the print management service 103. The MFP 110 may print in the inkjet system or may print in the electrophotographic system.

Figure 2:
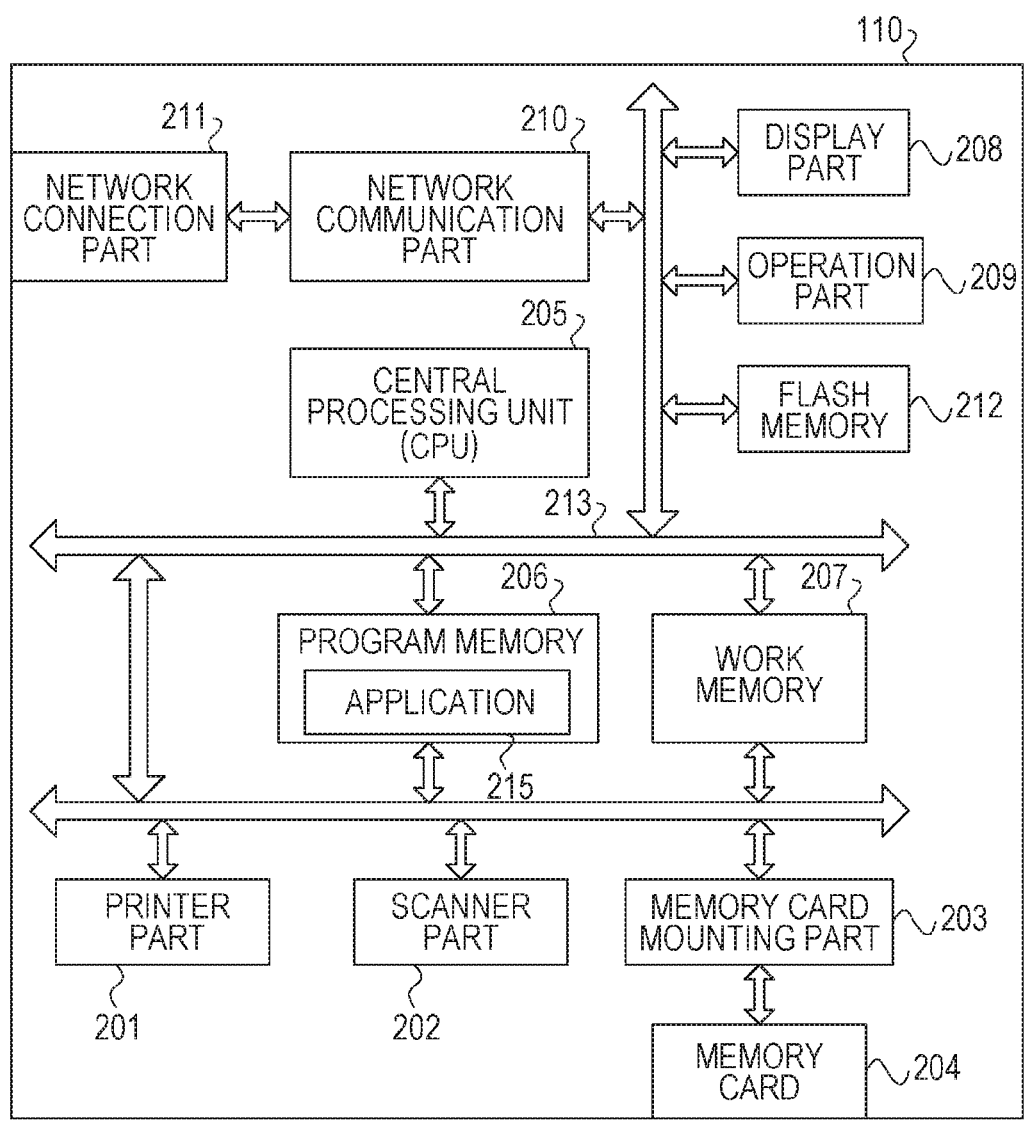
FIG. 2 is a block diagram illustrating a schematic configuration of a MFP.

FIG. 2 is a block diagram illustrating a schematic configuration of the MFP 110 as an image processing apparatus. Only the MFP as a peripheral apparatus will be described by way of example in the present specification, but a peripheral apparatus may be an image processing apparatus, a copying machine, a facsimile, a single-function printing apparatus, or the like.

In the MFP 110, a print function is realized in a printer part 201, a scanner function is realized in a scanner part 202, and a storage function is realized in a memory card mounting part 203 and a memory card 204.

The printer part 201 prints image data received from the outside or image data stored in the memory card 204 onto a sheet to be printed in a recording system such as inkjet system or electrophotographic system. The printer part 201 manages ink information including the amount of remaining ink and sheet information including the number of loaded sheets.

The scanner part 202 optically reads and converts a document set on a document table (not illustrated) into electronic data, and transmits image data further converted into a designated file format to an external apparatus via a network or stores it in a storage area (not illustrated) such as HDD. The image data generated by reading the document placed on the document table by the scanner part 202 is transferred to the printer part 201 and the printer part 201 prints the image data on a sheet to be printed so that the copying service is realized.

The memory card 204 mounted on the memory card mounting part 203 stores various items of file data. The file data may be read and edited from an external apparatus via a network. File data may be stored in the memory card 204 from an external apparatus.

Further, the MFP 110 includes a CPU 205, a program memory 206, a work memory 207, a display part 208, an operation part 209, a network communication part 210, a network connection part 211, and a flash memory 212. The CPU 205 is a central processing unit for controlling each part in the MFP 110. The program memory 206 is configured of a ROM or the like, and stores various program codes, or an application 215 for making communication with a server apparatus. The application 215 accesses the printer part 201 to acquire consumable information on inks and sheets. The work memory 207 is configured of a RAM or the like, and temporarily stores or buffers image data when each service is executed. The display part 208 is configured of a LCD, for example, and displays various items of information. The operation part 209 is configured of a switch or the like by which the user performs various input operations. The network communication part 210 connects the MFP 110 to a network thereby to make various communications. The network communication part 210 is connectable with a network such as Internet via the network connection part 211. The network communication part 210 is for wired LAN or wireless LAN, the network connection part 211 for wired LAN is a connector for connecting a wired LAN cable, and the network connection part 211 for wireless LAN serves as an antenna. The network connection part 211 may be for both wired LAN and wireless LAN. The flash memory 212 is a nonvolatile memory for storing image data and the like received by the network communication part 210. The respective parts described above are mutually connected via a bus 213. Further, the CPU 205 reads and executes the programs required for the processings so that the processings of the MIT 110 described below are realized.

Figure 3:
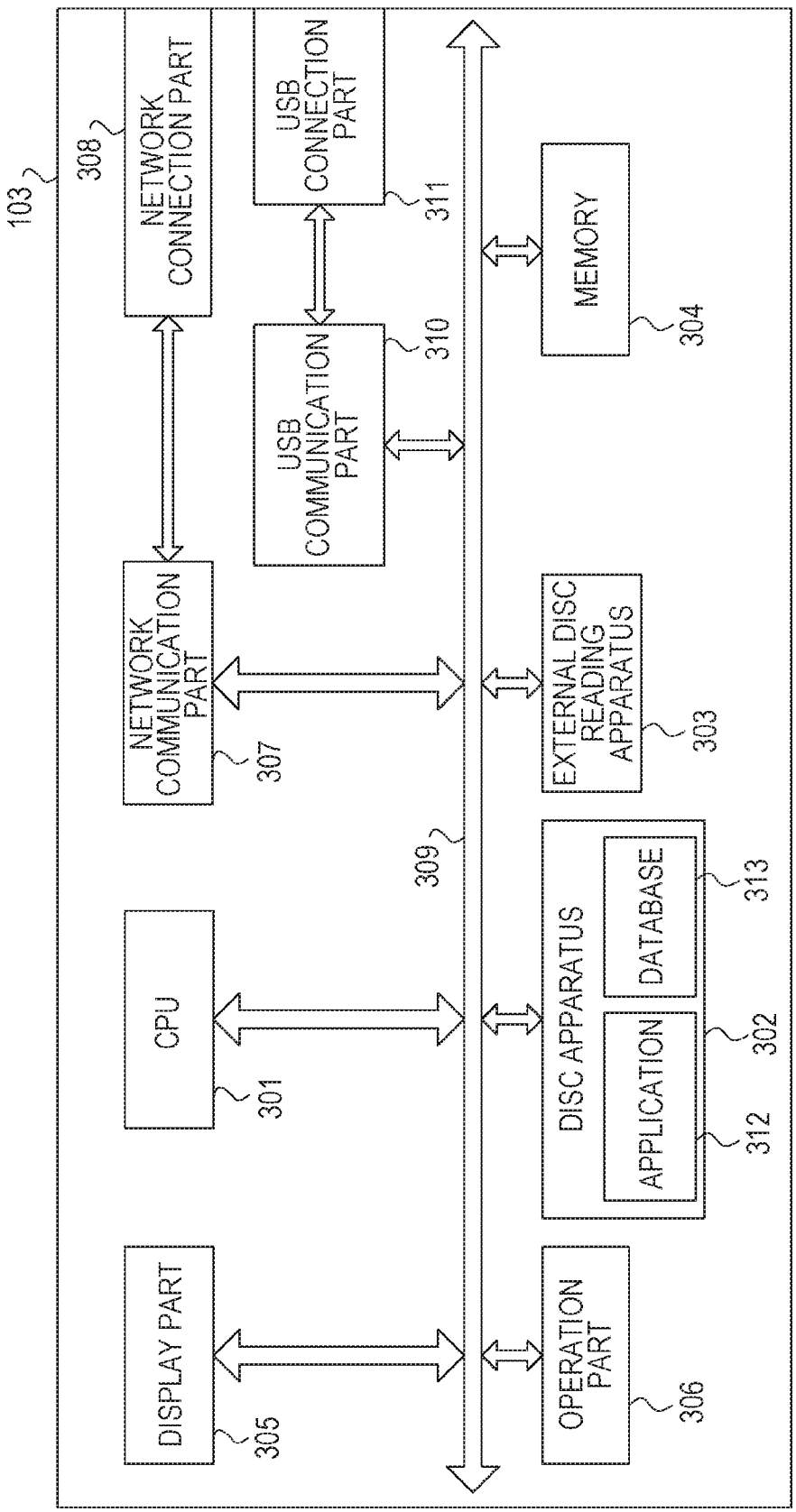
FIG. 3 is a block diagram illustrating a schematic configuration of a management server.

FIG. 3 is a block diagram illustrating a schematic configuration of a server (also denoted as print management apparatus) which provides the print management service 103.

A CPU 301 is a central processing unit for controlling each part described below. A disc apparatus 302 stores various files in addition to an application program 312 read by the CPU 301, a database 313, and an OS. An external storage medium reading apparatus 303 is directed for reading information on files and the like stored in an external storage medium such as SD card. A memory 304 is configured of a RAM or the like, and the CPU 301 temporarily stores or buffers data therein as needed. A display part 305 is configured of a LCD, for example, and displays various items of information. An operation part 306 is configured of a keyboard or a mouse by which the user performs various input operations. A network communication part 307 is connected to a network such as Internet via a network connection part 308, and makes various communications. The network communication part 307 is for wired LAN or wireless LAN, the network connection part 308 for wired LAN is a connector for connecting a wired LAN cable, and the network connection part 308 for wireless LAN serves as an antenna. The network connection part 308 may be for both wired LAN and wireless LAN. A USB communication part 310 is connected to various peripheral apparatuses via a USB connection part 311, and makes various communications. The respective parts described above are mutually connected via a bus 309. The CPU 301 reads and executes the programs required for the processings so that the processings of the print management service 103 described below are realized.

Figure 4:
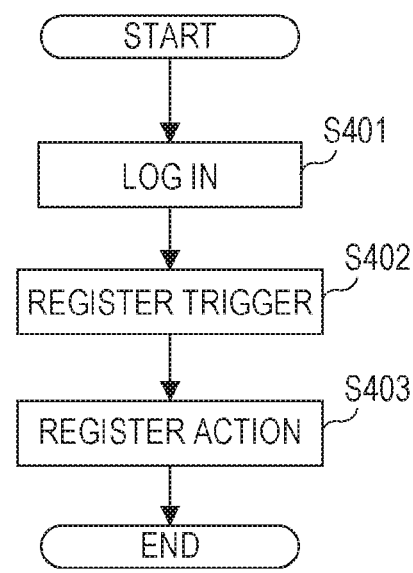
FIG. 4 is a flowchart illustrating a flow of using the service-associated printing system.

FIG. 4 is a flowchart illustrating a flow of using a service in the service-associated printing system illustrated in FIG. 1. The relay service 101 displays a login screen for a user terminal. The user inputs the user information for the relay service 101, which is previously registered for using the relay service 101, and performs the login processing (S401).

After the login processing is performed, the relay service 101 receives an instruction to register the Web service 102 as a trigger to be activated when any processing is performed from the user (S402). Subsequently, the relay service 101 receives an instruction to register the print management service 103 as an action to be processed when the trigger is activated from the user (S403). The action may be denoted as execution processing. In this way, the relay service 101 registers the trigger and the action in response to the user's instructions thereby to perform the associated processings. For example, when the processing registered as a trigger is performed in the Web service 102, the data based on the processing as a trigger is passed to the print management service 103 registered as an action thereby to perform the print processing. The relay service 101 can associate and manage the user information for the relay service 101 used for the login in S401, and the trigger and the action registered in S402 and S403.

The trigger registration in S402 will be first described with reference to FIG. 5.

Figure 5:
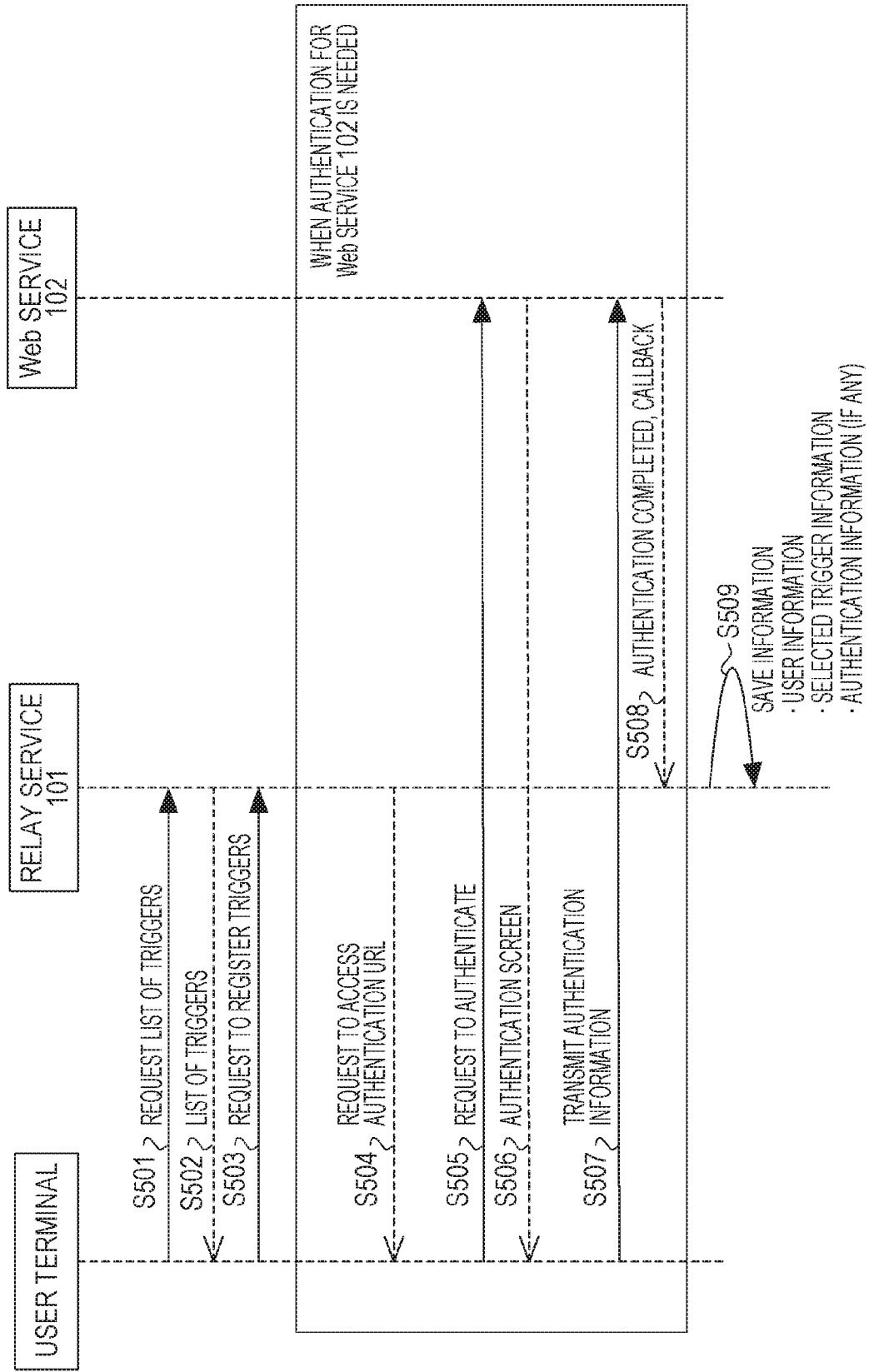
FIG. 5 is a sequence diagram until a user registers a trigger.

FIG. 5 is a sequence diagram until the user registers the trigger. Before starting S501 in FIG. 5, the user selects the Web service 102 from among a plurality of services as trigger candidates by use of a screen provided by the relay service 101.

When the user requests the relay service 101 to acquire a list of triggers for the Web service 102 (S501), the relay service 101 returns the information on the list of triggers for the Web service 102 to the user (S502). Exemplary triggers for the Web service 102 are illustrated herein. If the Web service 102 is a social networking service capable of posting a tagged image, exemplary triggers are to post an image with a specific hashtag or to post with its own tag.

Figure 6:
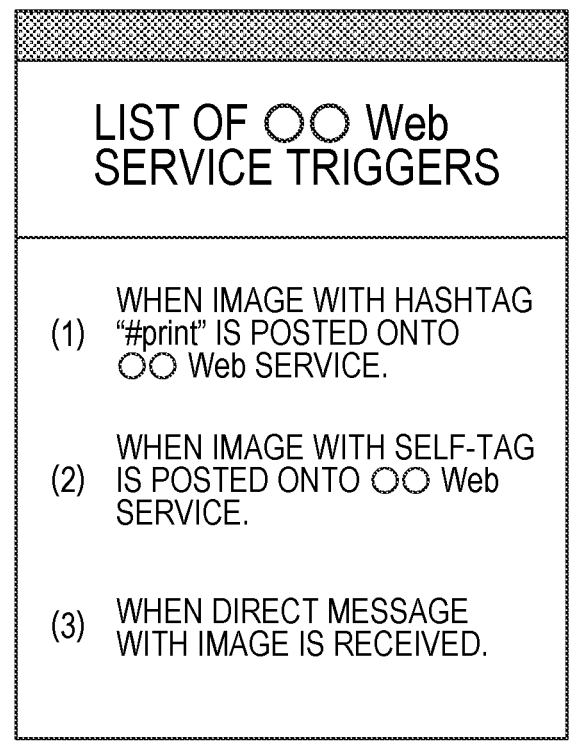
FIG. 6 illustrates an exemplary display screen of a list of triggers.

The relay service 101 displays the list of registerable triggers on the user terminal as illustrated in FIG. 6 in response to the request in S501 (S502), and the user terminal transmits a request to register a user-selected trigger to the relay service 101 (S503). Here, the display processing on the user terminal may be performed by use of a Web browser of the user terminal or may be performed by use of a local application of the user terminal.

When the Web service 102 does not need authentication, the relay service 101 saves the user information for the relay service 101 and the selected trigger information (S509).

When the Web service 102 requires user authentication like the above-described social networking service, the processings in S504 to S508 are performed. The user authentication processing denoted as Oauth is performed according to the present embodiment.

In S504, the relay service 101 requests the user terminal to access the URL for authenticating the Web service 102 previously registered in the relay service 101. The user terminal which receives the request transmits an authentication request to the Web service 102 (S505), and acquires an authentication screen from the Web service 102 (S506).

The authentication screen acquired in S506 is displayed on the user terminal. The user inputs the authentication information required for using the service of the Web service 102 by use of the authentication screen. For example, the user ID and the password registered by the user for logging in the Web service 102 correspond to the authentication information required for using the service of the Web service 102.

The user inputs the authentication information required for using the service of the Web service 102 on the user terminal and transmits it to the Web service 102 (S507), and then the Web service 102 performs the authentication processing. When the authentication processing is normally completed, the Web service 102 transmits callback to the relay service 101 (S508). The relay service 101 can acquire an access token for accessing the Web service 102 by the callback.

Here, the relay service 101 associates the information on the access token or refresh token required for accessing the Web service 102 with the user information for the relay service 101, and saves it together with the user-selected trigger information (S509).

The expiration time of the access token or refresh token is assumed as infinite (or finite which can be regarded as infinite in actual use). This is because when a trigger occurs cannot be known and re-authentication is difficult to perform later.

The user authentication operation has been described above as a method for associating the relay service 101 with the Web service 102, but other method capable of associating the relay service 101 with the Web service 102 may be employed.

Figure 7:
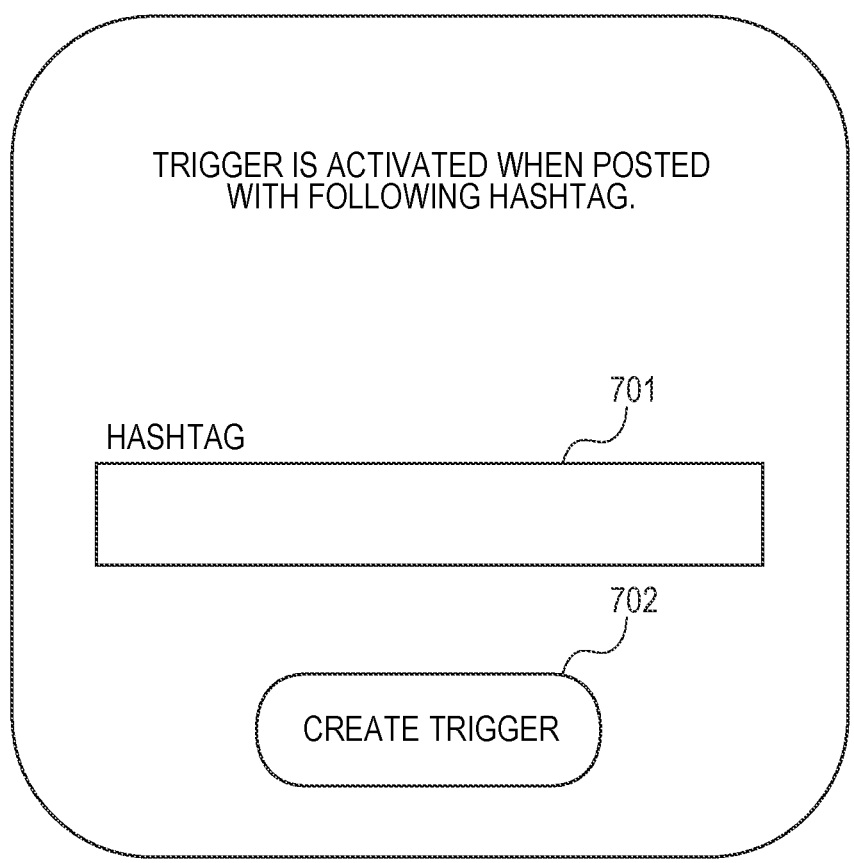
FIG. 7 illustrates an exemplary trigger setting screen.

FIG. 7 illustrates a trigger setting screen of the Web service 102. The present trigger is caused when an image with a specific hashtag is posted. A hashtag setting field 701 is directed for inputting a specific hashtag character string. When the user presses a trigger creation button 702 so that the trigger is set. For example, the user inputs a hashtag "#/Print" into the hashtag setting field 701, and presses the trigger creation button 702. Consequently, "the user as setter posts image data with "#Print" onto the Web service 102" is set as a trigger for the relay service 101.

The action registration in S403 will be described below.

Figure 8:
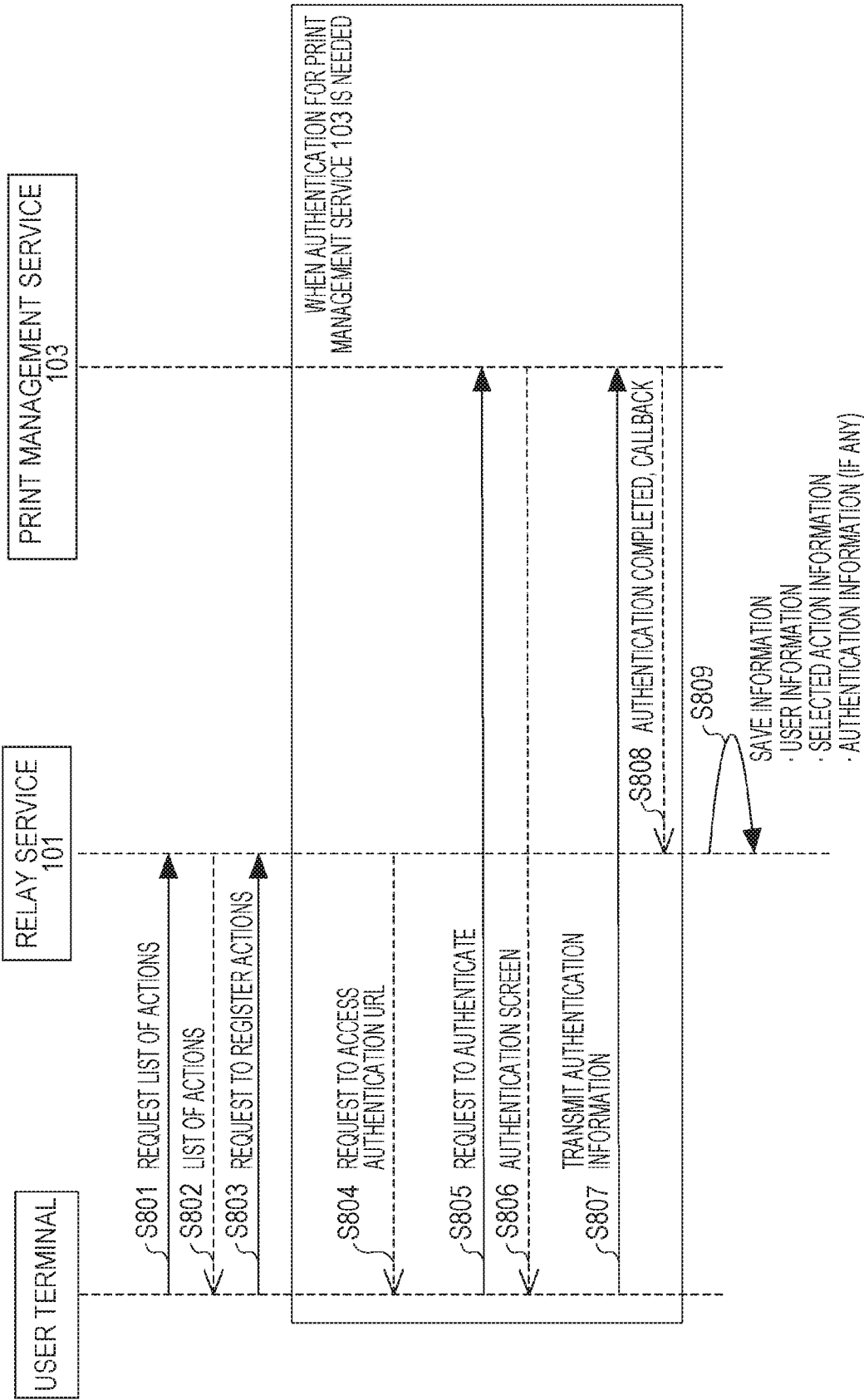
FIG. 8 is a sequence diagram until the user registers an action.

FIG. 8 illustrates a sequence diagram until the user registers the action. Before starting S801 in FIG. 8, the user selects the print management service 103 from among a plurality of services as action candidates by use of a screen provided by the relay service 101.

When the user requests the relay service 101 to acquire a list of actions for the print management service 103 (S801), the relay service 101 returns the information on the list of actions for the print management service 103 to the user (S802). Here, the actions for the print management service 103 are an action of printing an image, an action of printing game contents such as Number Place, and the like as illustrated in FIG. 9, for example.

Figure 9:
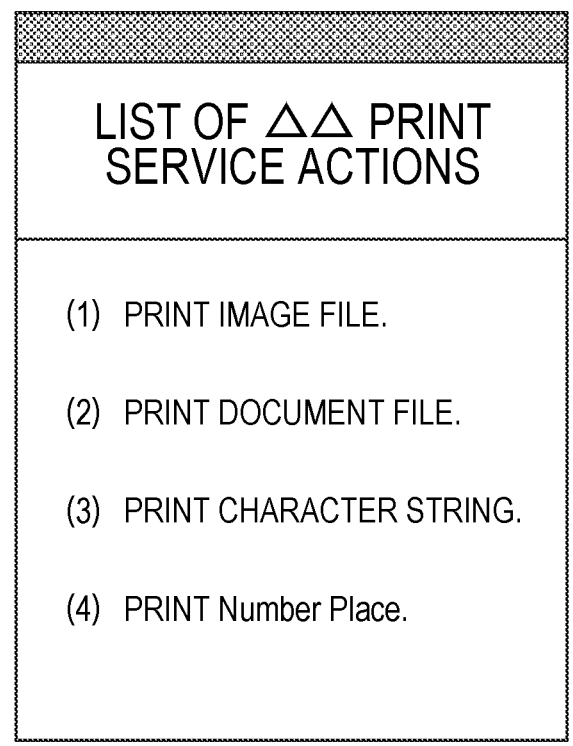
FIG. 9 illustrates an exemplary display screen of a list of actions.

The user terminal then displays the list of registerable actions for the print management service 103 as illustrated in FIG. 9, and transmits a request to register a user-selected action to the relay service 101 (S803). Here, the display processing on the user terminal may be performed by use of a Web browser of the user terminal or may be performed by use of a local application of the user terminal.

When the print management service 103 does not need authentication, the relay service 101 saves the information on the user-selected action together with the user information for the relay service 101 in S809 on the basis of the information on the user-selected action. On the other hand, when the print management service 103 needs user authentication, the processings in S804 to S808 are performed.

In S804, the relay service 101 requests the user terminal to access the URL for authenticating the print management service 103 previously registered in the relay service 101. The user terminal which receives the request transmits an authentication request to the print management service 103 (S805), and acquires the authentication screen from the print management service 103 (S806).

The authentication screen acquired in S806 is displayed on the user terminal. The user inputs the authentication information required for using the service of the print management service 103 by use of the authentication screen. For example, the user ID and the password registered by the user for logging in the print management service 103 correspond to the authentication information required for using the service of the print management service 103.

The user inputs the authentication information required for using the service of the print management service 103 on the user terminal and transmits it to the print management service 103 (S807), and then the print management service 103 performs the authentication processing. When the authentication processing is normally, completed, the print management service 103 transmits callback to the relay service 101 (S808). Here, the relay service 101 associates the information on the access token or refresh token required for accessing the print management service 103 with the user information for the relay service 101, and saves it together with the user-selected action information (S809).

The expiration time of the access token or refresh token is assumed as infinite (or finite which can be regarded as infinite in actual use). This is because when an action occurs cannot be known and re-authentication is difficult to perform later).

The user authentication operation has been described above as a method for associating the relay service 101 with the print management service 103, but any method capable of associating the relay service 101 with the print management service 103 may be employed.

Figure 10:
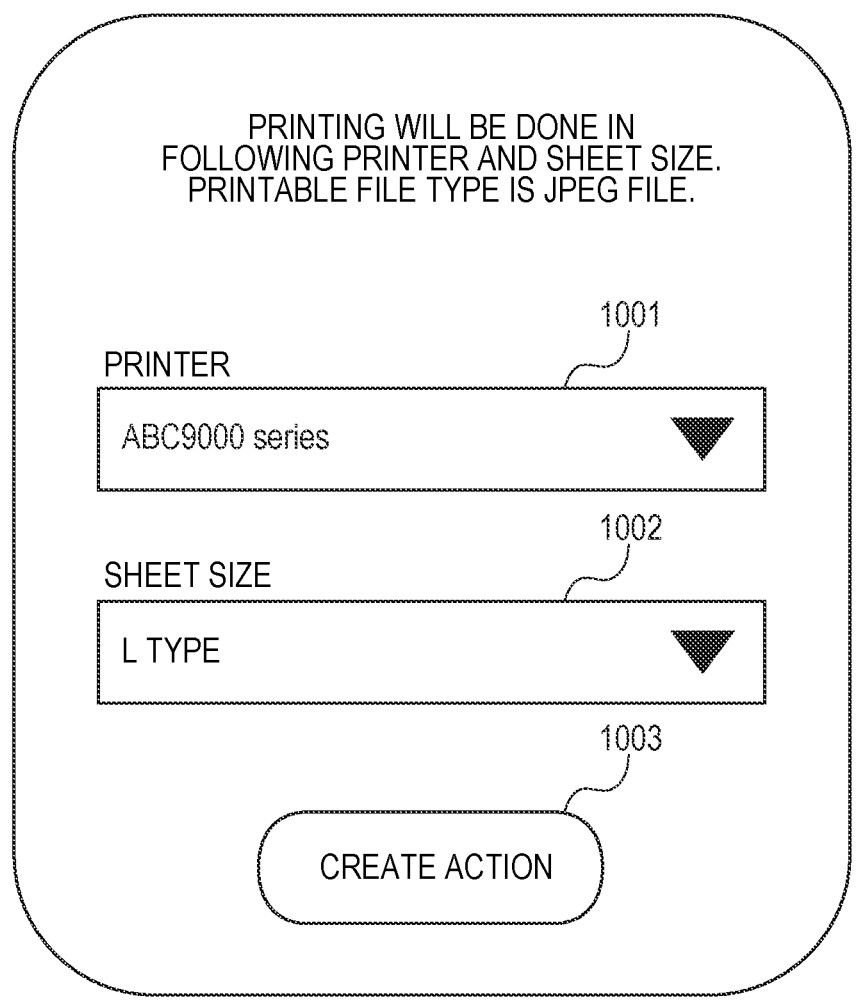
FIG. 10 illustrates an exemplary action setting screen.

FIG. 10 illustrates an action setting screen of the print management service 103. FIG. 10 is also displayed by the relay service 101. The action is to print a photograph in a PEG file, FIG. 10 is configured of two items including a printer selection menu and a sheet size menu. The printer selection menu 1001 is a dynamic menu component. The relay service 101 acquires a list of user's printers from the print management service 103, and displays it on the printer selection menu 1001. The user's printers are registered by the user into the print management service 103 (registered in association with the user account of the print management service 103). The printer name displayed in 1001 in FIG. 10 is assumed as the name of the MFP 110. The sheet size menu 1002 is assumed as a fixed option according to the present embodiment. For example, only L size or 4×6 size for printing a photograph is selectable. However, the sheet size menu may be a dynamic menu. That is, the print management service 103 transmits the sheet sizes usable in the user's printers to the relay service 101, and thus the options of the sheet size menu 1002 may be dynamically created. When the user presses an action creation button 1003, the setting is completed. The options selected in each menu in FIG. 10 are used as setting values. The information on the printing is set by use of FIG. 10, and thus FIG. 10 may be denoted as print setting screen.

The processings after the Web service 102 is registered as a trigger and the print management service 103 is registered as an action will be subsequently described with reference to FIG. 11.

At first, the relay service 101 inquires about whether the trigger is activated in the Web service 102. Thus, the relay service 101 transmits an inquiry request to the Web service 102 by use of the user information for the relay service 101 saved in S509, the trigger information, and the authentication information (S1101). The authentication information is an access token, a refresh token, or the like issued by the Web service 102.

The Web service 102 determines whether the trigger inquired in S1102 is activated on the basis of the received information. Then, when confirming that the trigger is activated, the Web service 102 returns the trigger activation information, the trigger-associated data, and the user information for the relay service 101 in the predetermined trigger format to the relay service 101 (S1103). The data returned in S1103 may be content data itself to be printed, or may be a URL indicating where content data to be printed is saved. The URL may be denoted as storing place information. A URL may not be employed if a storing place can be identified. On the other hand, when the trigger is not activated, the Web service 102 transmits the trigger non-activation information indicating that the trigger is not activated, and the user information for the relay service 101 to the relay service 101.

When the trigger non-activation information is transmitted by the Web service 102, the relay service 101 performs no processing, and performs the inquiry processing in S1101 again after a certain time elapses, and periodically inquires about the trigger activation information.

When the trigger activation information indicating that the trigger is activated and the user information for the relay service 101 are returned, the relay service 101 searches the action information associated with the relevant trigger by use of the user information for the relay service 101 (S1104). When the associated action information is searched in S1104, the relay service 101 gives the relevant data acquired in S1103 to the print management service 103 for performing the associated action, and instructs it to execute the action (S1105). Specifically, the relay service 101 accesses the print management service 103 by use of the authentication information saved in S809 (access token or refresh token issued by the print management service 103). The relay service 101 then transmits the relevant data acquired in S1103 and the printer information included in the action information searched in S1104 in the predetermined action format. The print management service 103 which receives the instruction to execute the action generates print data on the basis of the relevant data received in S1105 and the sheet size information (S1106). When the relevant data is a URL, the print management service 103 acquires content data to be printed on the basis of the URL, and generates print data on the basis of the content data.

The print management service 103 then specifies the MFP 110 as a relevant printer on the basis of the printer information received in S1105, and instructs the MFP 110 to print (S1107).

The above example assumes herein that a request is periodically transmitted from the relay service 101 to the Web service 102 to monitor activation of the trigger in order to detect the activation of the trigger. However, any method therefor may be employed, and for example, a notification request may be transmitted from the Web service 102 to the relay service 101 when the trigger is activated.

Figure 12:
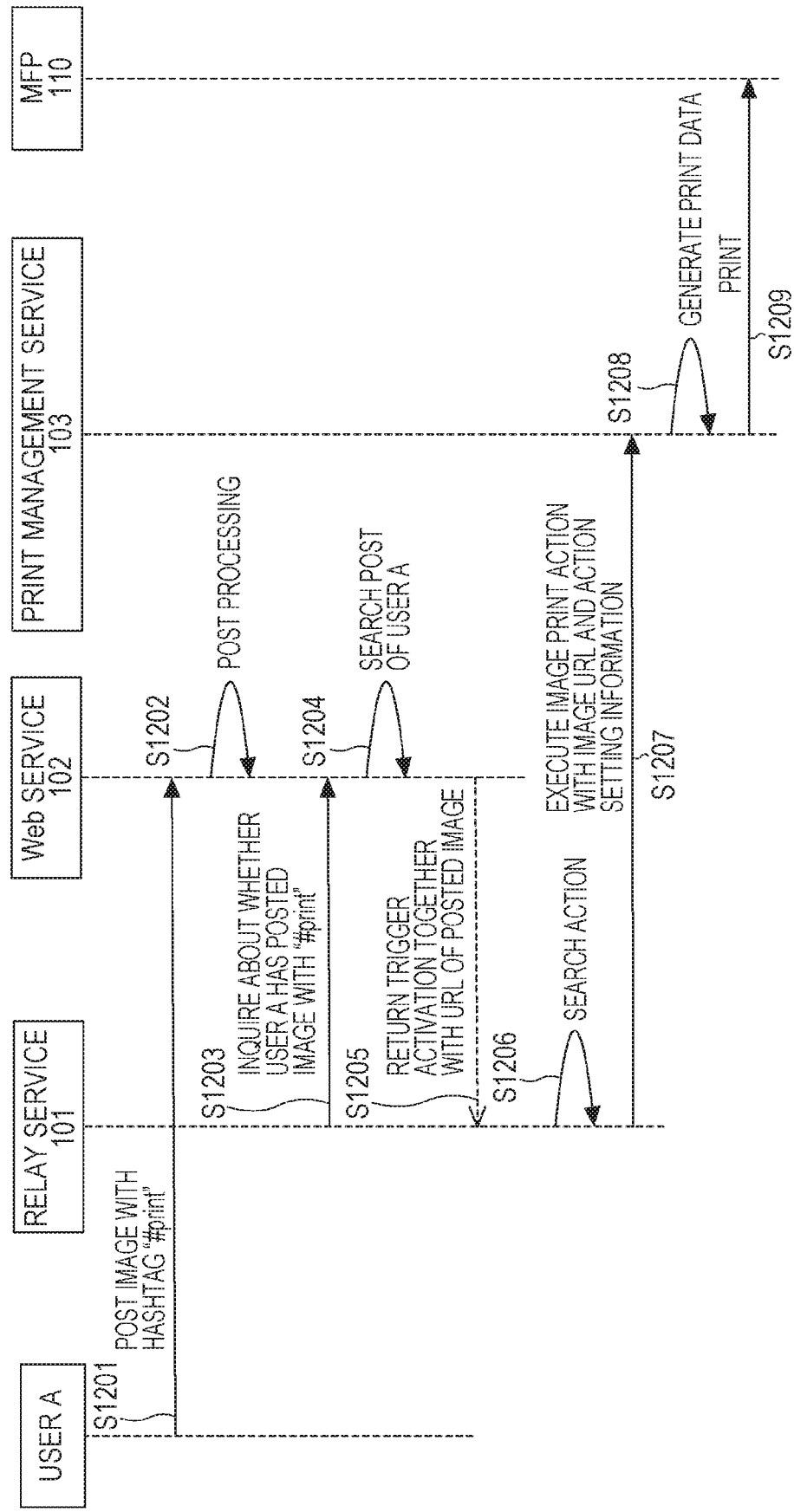
FIG. 12 is a sequence diagram for a print action.

The processings after the activation of the trigger until the execution of the action will be described with reference to FIG. 12. In the example of FIG. 12, the Web service 102 is a social networking service, and the user selects "when an image with a specific hashtag is posted" as a trigger. On the other hand, the user selects "print an image" as an action of the print management service 103.

In S1201, when a user A posts an image with a hashtag "#print" onto the Web service 102, the posting processing is performed on the Web service 102 (S1202).

In S1203, the relay service 101 inquires to the Web service 102 about whether the trigger is activated. Specifically, the relay service 101 accesses the Web service 102 by use of the access token or refresh token for the Web service 102 saved in S509. The relay service 101 then transmits the trigger information indicating "the user A posts an image with a hashtag "#print"" and the user information for the relay service 101.

When the Web service 102 receives the inquiry in S1203, the Web service 102 first specifies the user A by the access using the access token. The Web service 102 subsequently searches whether the specified user A performs the processing based on the trigger information. Specifically, the Web service 102 searches whether the user A has posted an image with a hashtag "#print" (S1204). The posted image with the hashtag "#print" is searched when posting of the user A is searched in S1204, and thus the Web service 102 determines that the trigger is activated. The Web service 102 then returns the URL capable of acquiring the posted image with the hashtag "#print," the trigger activation information indicating that the trigger is activated, and the user information for the relay service 101 to the relay service 101 (S1205).

When receiving the trigger activation information indicating that the trigger is activated, the relay service 101 searches the action information associated with the relevant trigger registered by the user A by use of the user information for the relay service 101 returned in S1205 (S1206). It is assumed herein that the action information "print an image on an L-size sheet by use of the MIT 110" is searched.

The relay service 101 transmits the URL of the posted image received in S1205, the sheet size (L size), the action setting information including the information for identifying the MFP 110 as a relevant printer, and the instruction to print the image to the print management service 103 (S1207).

The print management service 103 acquires the image data on the basis of the URL in response to the instruction in S1207, and generates print data on the basis of the acquired image data and the action setting information (such as sheet size L) (S1208). According to the present embodiment, the print management service 103 receives only the sheet size (L size) as the print setting information. Therefore, other print setting information (such as sheet type and single-side/double-side printing) uses the default values for instructing to print an image. For example, when the print management service 103 holds the default values "glossy paper," "single-side printing," and "borderless printing" for instructing to print an image, the print management service 103 generates print data by use of the default values and the sheet size received in S1207. Further, for example, the print management service 103 may hold the default values "plain paper" and "single-side printing" for instructing to print a document.

The print management sere ice 103 instructs the MFP 110 as a relevant printer included in the action setting information to print by use of the print data generated in S1208 (S1209). S1209 may be realized by the print management service 103 for transmitting the print data to the MFP 110. Further, S1209 may be realized by the print management service 103 for transmitting the print data storing place to the MFP 110. In this case, the MFP 110 acquires the print data from the received storing place, and performs the print processing based on the print data.

In this way, by use of the service-associated printing system, when a processing set as a trigger by the user is performed, a print action set by the user is automatically performed via the relay service 101.

Second Embodiment

According to the first embodiment, the Web service 102 is a social networking service, and the user selects "when an image with a specific hashtag is posted" as a trigger. The description has been made assuming that the user selects "print an image" as an action of the print management service 103.

According to the present embodiment, the description will be made assuming that the Web service 102 is a speech recognition service, the user selects "when saying a specific word" as a trigger and selects "print Number Place" as an action of the print management service 103.

Figure 19:
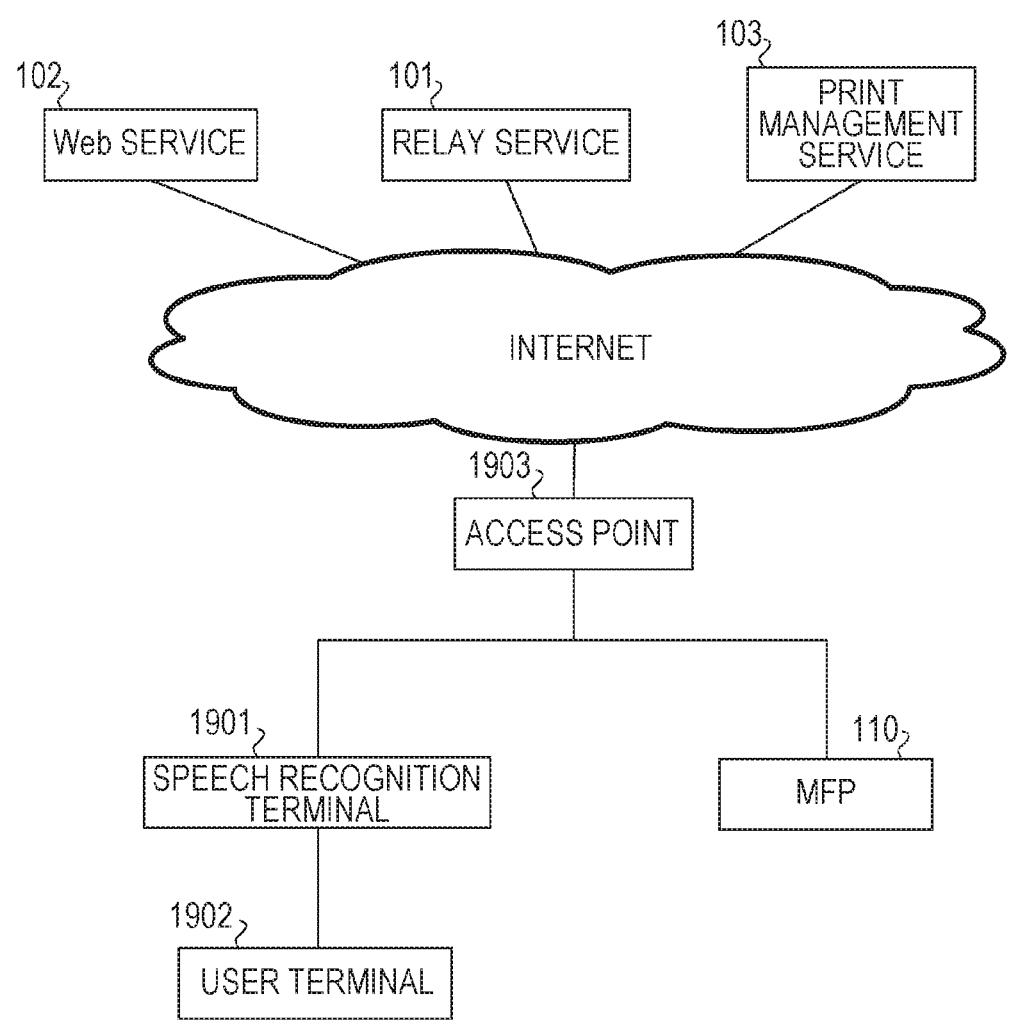
FIG. 19 is a block diagram illustrating an exemplary configuration of the service-associated printing system.

The same contents as in the first embodiment will be omitted from the description of the present embodiment. The Web service 102 of FIG. 19 is for a speech recognition terminal 1901, and may be the same as or different from the Web service according to the first embodiment.

A system configuration diagram according to the second embodiment will be first described with reference to FIG. 19.

The processings by use of the speech recognition terminal 1901 will be described according to the second embodiment. At first, the speech recognition terminal 1901 needs to connect to an access point 1903 in order to make communication with various services and the MIT 110. In order to realize the connection, the user A directly connects his/her own user terminal 1902 and the speech recognition terminal 1901. Two methods for the direct connection are assumed. The first method is a method for directly connecting the user terminal 1902 to an internal access point in the speech recognition terminal 1901 in a communication system conforming to the IEEE802.11 series. For example, a direct connection method in the WiFi communication system is assumed. In this case, the user A operates the user terminal 1902 and selects SSID corresponding to the internal access point in the speech recognition terminal 1901 so that the direct connection between the user terminal 1902 and the speech recognition terminal 1901 is established. The second method is a method for directly connecting the speech recognition terminal 1901 and the user terminal 1902 in a short-range wireless communication system. For example, the Bluetooth (registered trademark) system is assumed as an exemplary short-range wireless communication system. The communication speed is lower or the communication distance is shorter in the short-range wireless communication system as the second communication system than in the communication system conforming to the IEEE802.11 series as the first communication system. The speech recognition terminal 1901 may be for both the two direct connection methods, or may be for either one method. According to the present embodiment, the speech recognition terminal 1901 for both the two direct connection methods may be denoted as speech recognition terminal A. On the other hand, the speech recognition terminal 1901 for either one of the two direct connection methods may be denoted as speech recognition terminal B. Here, when the speech recognition terminal A is used, the user selects either direct connection method by use of the user terminal 1902 and establishes direct connection between the speech recognition terminal A and the user terminal 1902. Thereafter, the user A operates the user terminal 1902, inputs the connection information on the access point (the access point 1903 according to the present embodiment) for connecting the speech recognition terminal A, and transmits it to the speech recognition terminal A via the direct connection. For example, when a plurality of access points are present around the user terminal 1902, the user terminal 1902 displays a list of access points (list of SSIDs). The user selects a desired access point (the access point 1903 according to the present embodiment) from the list, and inputs the password of the selected access point. With the above user operation, the user terminal 1902 transmits the connection information to the speech recognition terminal A via the direct connection. The SSID or the password of the access point 1903 is assumed as exemplary connection information. The speech recognition terminal A establishes wireless connection with the access point 1903 by use of the connection information received from the user terminal 1902 via the direct connection. With the above processings, the speech recognition terminal A can make wireless communication with the services 101 to 103 and the MFP 110. The wireless communication used in this case is in a communication system conforming to the IEEE802.11 series, for example. The description will be subsequently made assuming that the second direct connection method. (or the use of short-range wireless communication) is selected in order to directly connect the speech recognition terminal A and the user terminal 1902 while the user terminal 1902 is selected for the access point 1903. In this case, the user terminal 1902 can make short-range wireless communication with the speech recognition terminal A while keeping connection with the access point 1903. Thus, the access point 1903, as an access point for connecting to the speech recognition terminal A, may be displayed ahead of the other access points on the user terminal 1902. For example, only the access point 1903 may be displayed, or only the access point 1903 may be displayed in a different color from the other access points. The access points are displayed on the user terminal 1902 according to the present embodiment, and the display indicates that the SSIDs are displayed. Further, the list of access points (SSIDs) displayed on the user terminal 1902 may be displayed when the user terminal 1902 itself searches it. Additionally, the user terminal 1902 acquires the result searched by the speech recognition terminal 1901 via the short-range wireless communication thereby to display it thereon. When the speech recognition terminal B is connected to the access point 1903, a direct connection system does not need to be selected. The other setting processings are the same as in the speech recognition terminal A.

Figure 13:
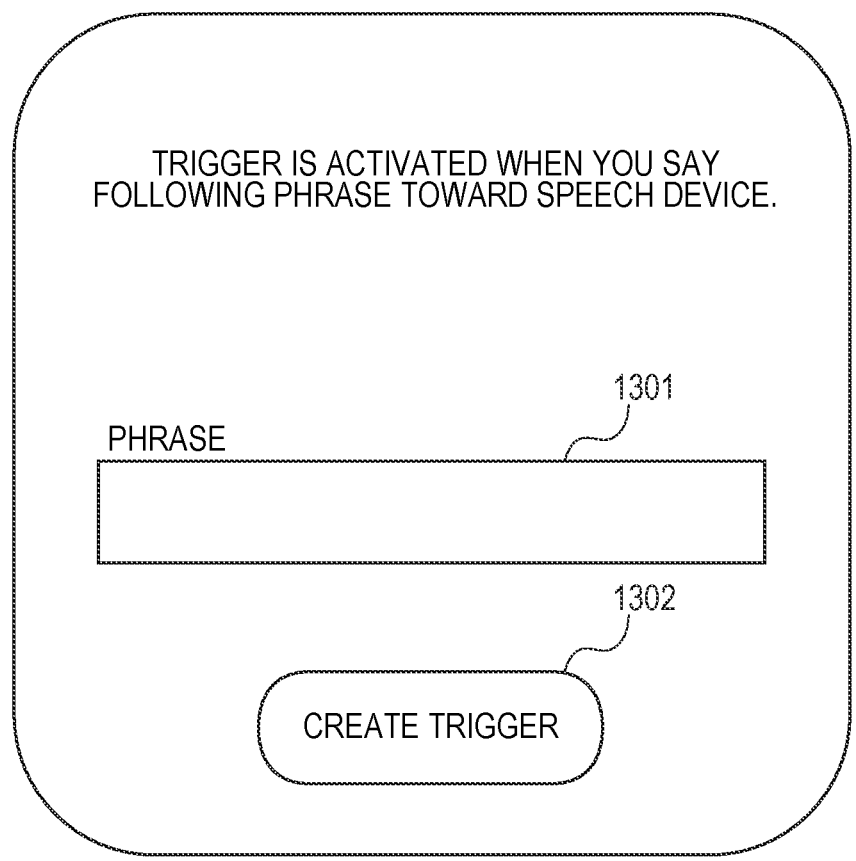
FIG. 13 illustrates an exemplary trigger setting screen.

FIG. 13 illustrates another exemplary trigger setting screen provided by the Web service 102. The user can set "saying a specific word" as a trigger by use of FIG. 13. A phrase input column 1301 is for a phrase to be recognized. A specific "wake word" may need to be input before a phrase. Here, a phrase to be recognized except the "wake word." is input. A trigger creation button 1302 is a trigger setting completion button. According to the present embodiment, when the list of triggers is requested to the relay service 101, FIG. 13 is displayed. After the trigger is completely registered on the basis of the information set in FIG. 13 (after S509 in FIG. 5), the relay service 101 accesses the Web service 102 by use of the access token issued by the Web service 102. The relay service 101 then passes the user information for the relay service 101, and the contents of the trigger set by use of FIG. 13. With the processing, the Web service 102 can associate and manage the user information of the user A for the Web service 102, the user information for the relay service 101, and the trigger information.

Figure 14:
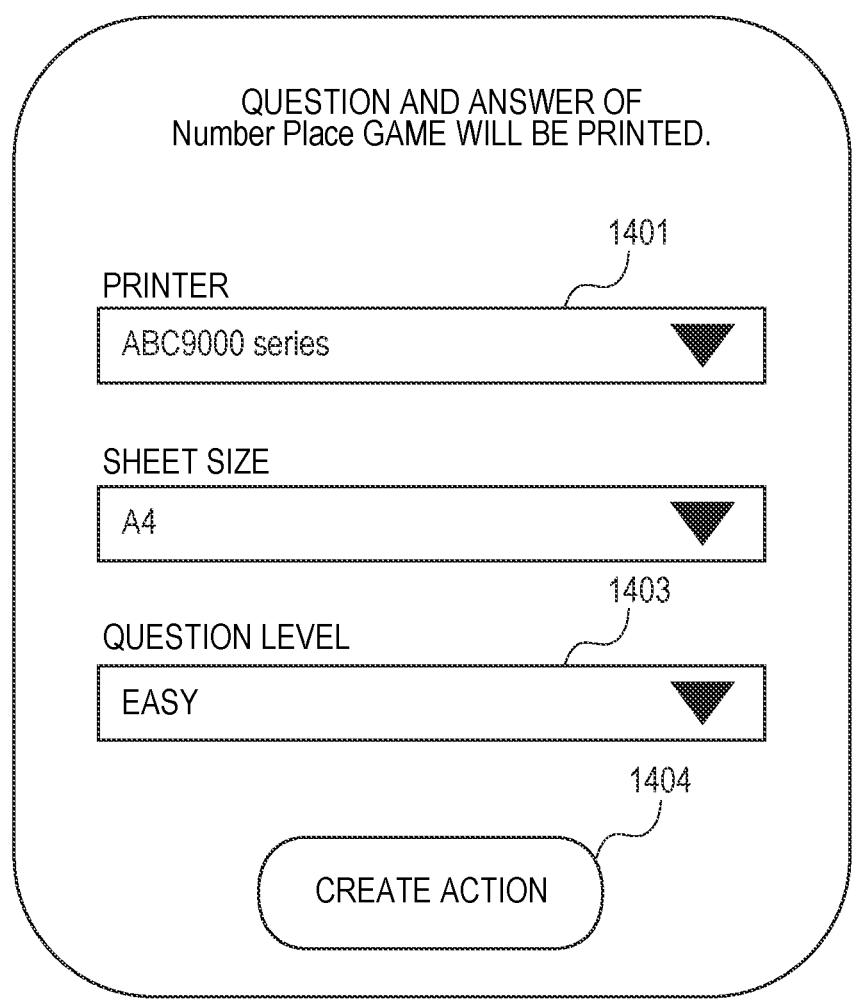
FIG. 14 illustrates an exemplary action setting screen.

FIG. 14 illustrates another exemplary action setting screen of the print management service 103. Additionally, FIG. 14 is also displayed by the relay service 101. The user can set "print Number Place" as an action by use of FIG. 14. A printer selection menu 1401 and a sheet size are described above in FIG. 10, and thus the detailed description thereof will be omitted, but the options of the sheet size are A4, letter size, and the like, for example. A question level menu 1403 receives the setting of a difficulty level of the Number Place game. According to the present embodiment, the user can select one of the three kinds "easy" "medium," and "difficult." When an action creation button 1404 is pressed, the setting is completed. The Number Place game is exemplary, and other game or other contents may be printed. Other contents such as coloring, music paper for musical notes, and writing paper may be printed. FIG. 14 may be denoted as print setting screen.

Figure 15:
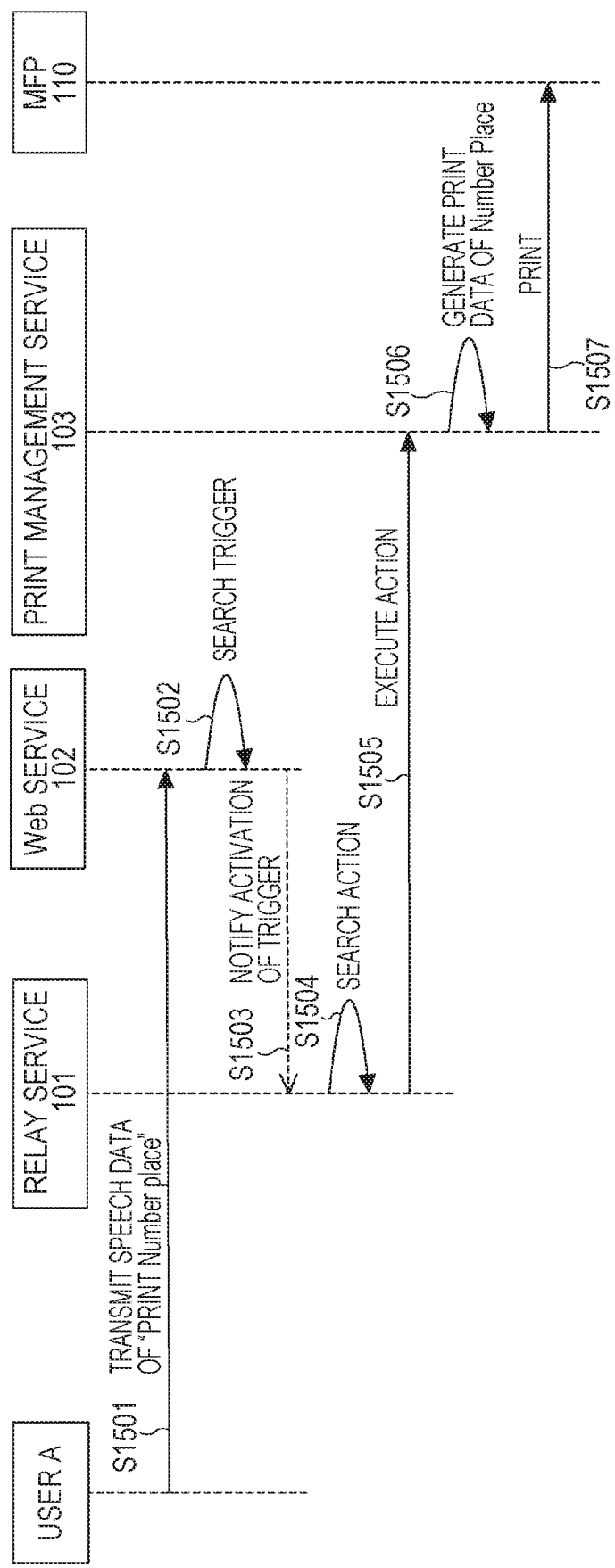
FIG. 15 is a sequence diagram for the print action.

FIG. 15 is a sequence diagram illustrating the processings until the action is performed after the trigger is activated when a specific word "print Number Place" is registered.

The user A says the words "print Number Place" (speech instruction) toward the speech recognition terminal capable of being associated with the speech recognition service corresponding to the Web service 102. With the speech instruction, the speech recognition terminal 1901 transmits the speech data "print Number Place", and the identification information of the speech recognition terminal 1901 to the Web service 102 for the speech recognition terminal 1901 (S1501). The words of speech data are denoted here, but data by which the Web service 102 can detect activation of a set trigger has only to be transmitted, and text data as a result of the speech recognition processing in the speech recognition terminal may be transmitted to the Web service 102, for example.

After receiving the data, the Web service 102 searches the trigger based on the received data (S1502). Specifically, the Web service 102 specifies the user information for the Web service 102 from the identification information of the speech recognition terminal, and searches the user information for the relay service 101 and the trigger information managed in association with the user information for the Web service 102. Here, when the phrase set in the searched trigger corresponds to the data received in S1501, the Web service 102 determines that the corresponding trigger is present in S1502. When determining that the corresponding trigger is present as a result of the searching, the Web service 102 notifies the activation of the trigger and the user information for the relay service 101 to the relay service 101 in S1503. Here, detecting activation of the trigger is not necessarily limited to making a notification from the Web service 102 to the relay service 101 as illustrated in FIG. 15. For example, there may be configured such that a request in S1101 is periodically transmitted from the relay service 101 to the Web service 102 thereby to monitor activation of a trigger as illustrated in FIG. 11.

The relay service 101 searches the action information associated with the relevant trigger managed in association with the user A by use of the user information for the relay service 101 returned in S1503 in response to the activation of the trigger (S1504). The relay service 101 then transmits execution of the action to the print management service 103 in S1505. In S1505, an instruction to print Number Place, the difficulty level set in FIG. 14, and the sheet size are transmitted. The print management service 103 generates print data of Number Place in S1506. According to the present embodiment, the print management service 103 receives only the sheet size as print setting information. Thus, other print setting information (such as sheet type and single-side/double-side printing) uses the default values for instructing to print Number Place. For example, it is assumed that the print management service 103 holds the default values "plain paper" and "single-side printing" for instructing to print Number Place. The print management service 103 generates print data by use of the default values, the sheet size received in S1505, and the content data specified on the basis of the difficult level information acquired in S1505. The content data is held in the memory 304 in the server which provides the print management service 103. The print management service 103 may previously hold content data per difficulty level, and may select content data corresponding to a selected difficulty level. As another method, the print management service 103 may not previously hold content data per difficulty level. In this case, the print management service 103 can generate content data on the basis of the received difficulty level information.

The print management sere ice 103 instructs the MFP 110 as a relevant printer included in the action setting information to print by use of the print data generated in S1506 (S1507).

Here, a language-dependent character string is included in the Number Place print data as illustrated in FIG. 16. The print management service 103 holds a table of font names corresponding to languages and character strings to be used as illustrated in FIG. 17. The print management service 103 then determines a font corresponding to user's language in S1506 on the basis of the user's language information included in the request to execute the action in S1505 in FIG. 15. The print management service 103 then generates print data by use of the determined font. The method for acquiring user's language information may be to acquire user's language information on the basis of the user information of the Web service 102 or the print management service 103, or to cause the user to set a language to be printed on the action setting screen illustrated in FIG. 14. Different information from the language information may be used. For example, country code or regional information may be used instead of the language information.

When the speech recognition terminal A is used in a plurality of types of speech recognition terminals A and B as described above, the Web service 102 for the speech recognition terminal A is used, and when the speech recognition terminal B is used, the Web service 102 for the speech recognition terminal B is used.

With the above processings, it is possible to print game contents such as Number Place in an easy operation.

Third Embodiment

The first and second embodiments have described that a trigger and an action are separately set, but the present embodiment will describe that processing sets are set in a set of trigger and action.

The description of the same contents as in the above embodiments, such as the configuration of the network system according to the present embodiment, will be omitted.

FIG. 18 illustrates another exemplary processing set setting screen provided by the relay service 101. Six sets included in FIG. 18 are created by the provider of the print management service 103, and are registered in the relay service 101. The screen of FIG. 18 is displayed by the relay service 101. When the user selects any set by use of the screen of FIG. 18, the relay service 101 sets a trigger and an action configuring the selected set. The processing of setting a trigger and an action is the same as in FIG. 5 and FIG. 8 of the above embodiment. The action content setting screen is also the same as in the above embodiment. For example, when "print an image with "#print" when posted" is selected in the first "o o Web service," the relay service 101 displays the screen of FIG. 10. Further, when "print Number Place when you say "print Number Place"" in the second or third service is selected, the relay service 101 displays the screen of FIG. 14.

Figure 11:
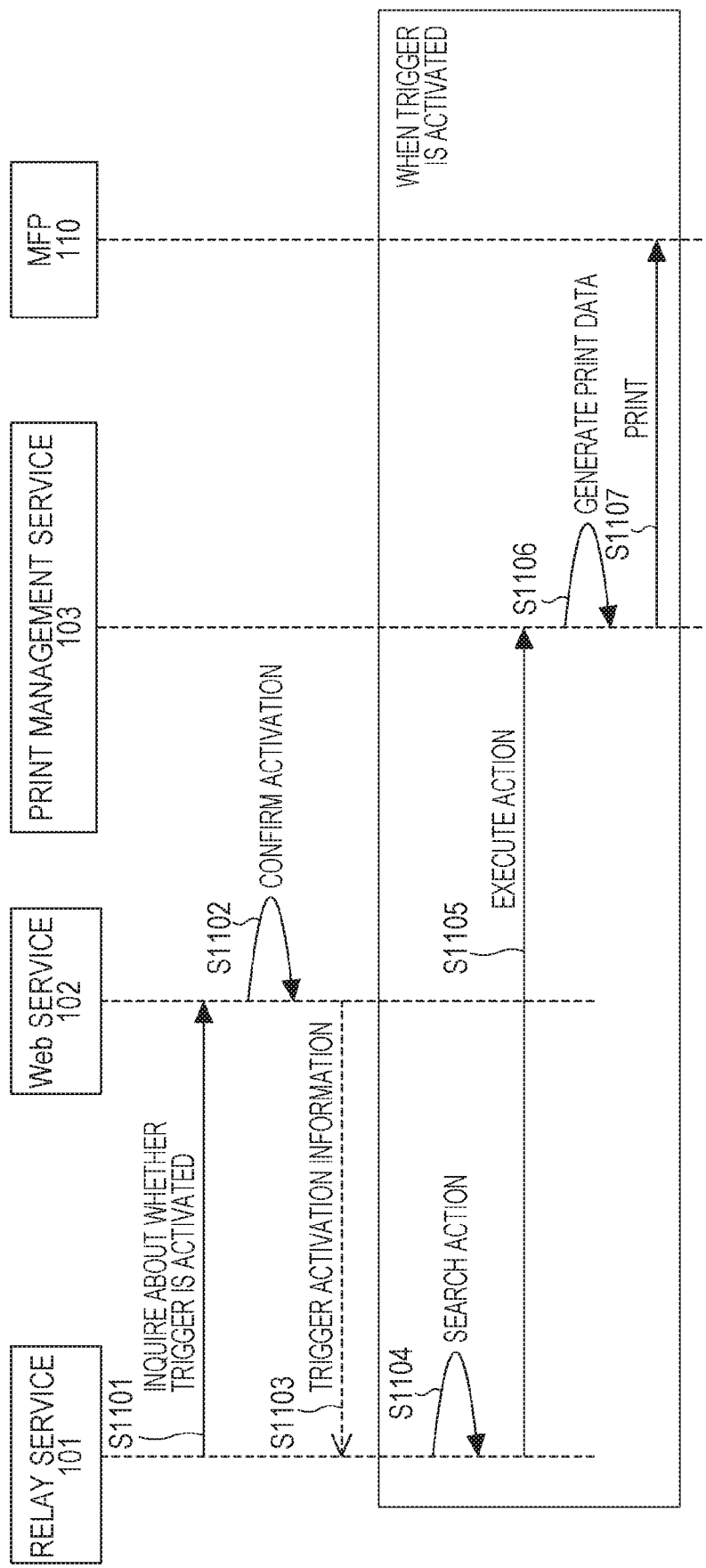
FIG. 11 is a sequence diagram until a trigger is activated and an action is executed.

When the first processing set is selected by use of FIG. 18, a flow of the processings from activation of the trigger to printing is the same as the processings in FIG. 11 and FIG. 12 described in the first embodiment. When the second and third processing sets are selected by use of FIG. 18, a flow of the processings from activation of the trigger to printing is the same as in the description of FIG. 15 according to the second embodiment. A difference between the speech recognition terminals A and B is as described in the second embodiment.

Figure 20:
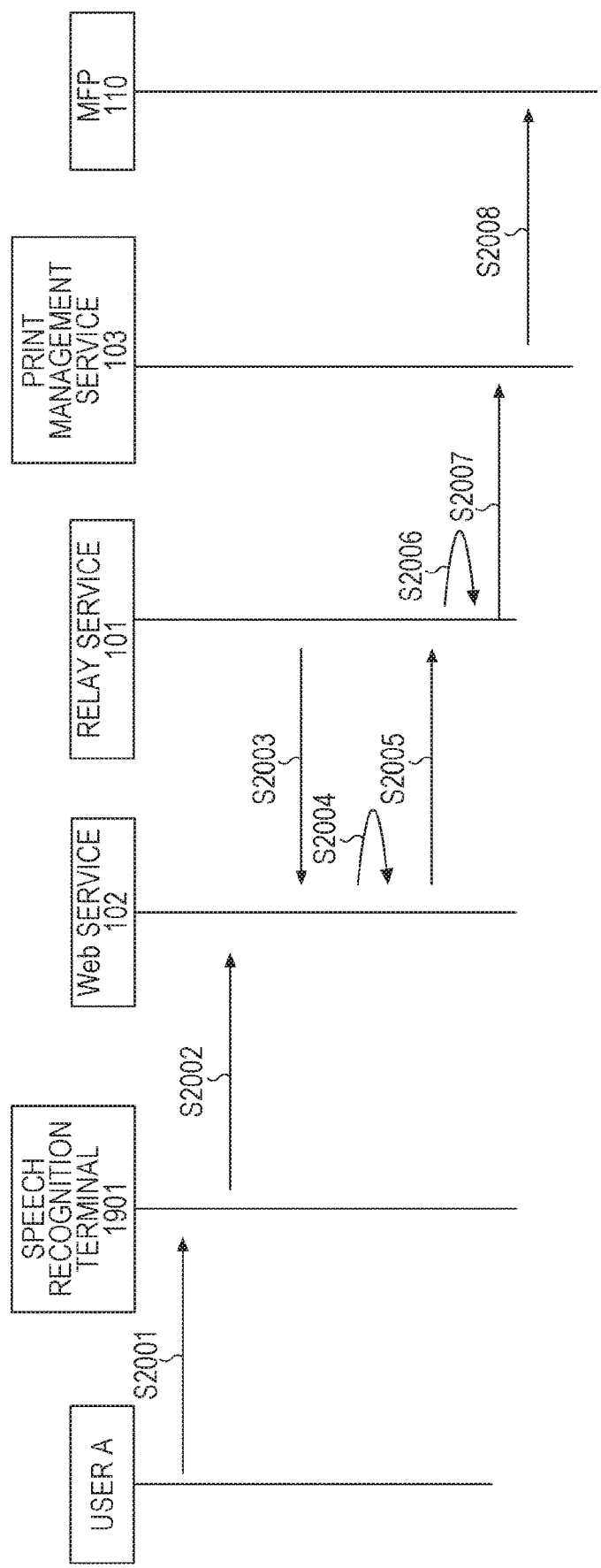
FIG. 20 is a sequence diagram until a trigger is activated and an action is executed.

The description will be made assuming that the fourth or fifth processing set is selected by use of FIG. 20. When the fourth processing set is selected, the speech recognition terminal A and the Web service 102 for the speech recognition terminal A are used, and when the fifth processing set is selected, the speech recognition terminal B and the Web service 102 for the speech recognition terminal B are used.

Further, when the fourth or fifth processing set is selected, the screen for setting a printer and a sheet size is displayed as illustrated in FIG. 10.

When the user A says "print to do list" toward the speech recognition terminal 1901, the speech recognition terminal 1901 receives user's speech contents (S2001). The speech recognition terminal 1901 then transmits the speech data "print to do list" and the identification information of the speech recognition terminal to the Web service 102 for the speech recognition terminal 1901 (S2002).

The Web service 102 receives the data, and then holds the received data. Specifically, the Web service 102 specifies the user information for the Web service 102 from the identification information of the speech recognition terminal 1901, and saves the speech data in association with the user information for the Web service 102.

The relay service 101 inquires to the Web service 102 about whether the trigger is activated (S2003). Specifically, the relay service 101 accesses the Web service 102 by use of the access token or refresh token for the Web service 102 saved in S509. The trigger information "speech data of the to do list" and the user information for the relay service 101 are then transmitted.

The Web service 102 specifies the user information for the Web service 102 of the user A by the access using the access token. Subsequently, the Web service 102 searches whether the "speech data of the to do list" is saved in association with the specified user information for the Web service 102 of the user A (S2004).

The "speech data of to do list" is searched in S2004. Thus, the Web service 102 returns the URL of the to do list managed in association with the user information for the Web service 102 of the user A, the trigger activation information indicating that the trigger is activated, and the user information for the relay service 101 to the relay service 101 (S2005).

When receiving the trigger activation information indicating that the trigger is activated, the relay service 101 searches the action information associated with the relevant trigger registered by the user A by use of the user information for the relay service 101 returned in S2005 (S2006). Here, the action information "print to do list by MFP 110" is searched.

The relay service 101 transmits the URL received in S2005, the action setting information including the identification information of the MFP 110 as a relevant printer, and the instruction to print the to do list to the print management service 103 (S2007).

The print management service 103 acquires the to do list on the basis of the URL and generates print data on the basis of the acquired to do list in response to the instruction in S2007. The print management service 103 then transmits the instruction to print the generated print data to the MFP 110 (S2008). The present embodiment has been described by way of printing the to do list, but other contents may be printed. For example, printing a shopping list is said toward the speech recognition terminal 1901, and thus the shopping list may be printed.

According to the present embodiment, the user can easily set a trigger and an action, thereby improving operability.

Fourth Embodiment

The present embodiment will be described assuming that the processings for a trigger is performed by the MFP 110. The processings according to the present embodiment correspond to the operations when "order ink when remaining ink in printer reduces" is selected in FIG. 18. The present embodiment will be described assuming that a reduction in remaining ink corresponds to 20% or less of the amount of remaining ink, but 20% is exemplary, and the other remaining amounts may be employed.

Figure 21:
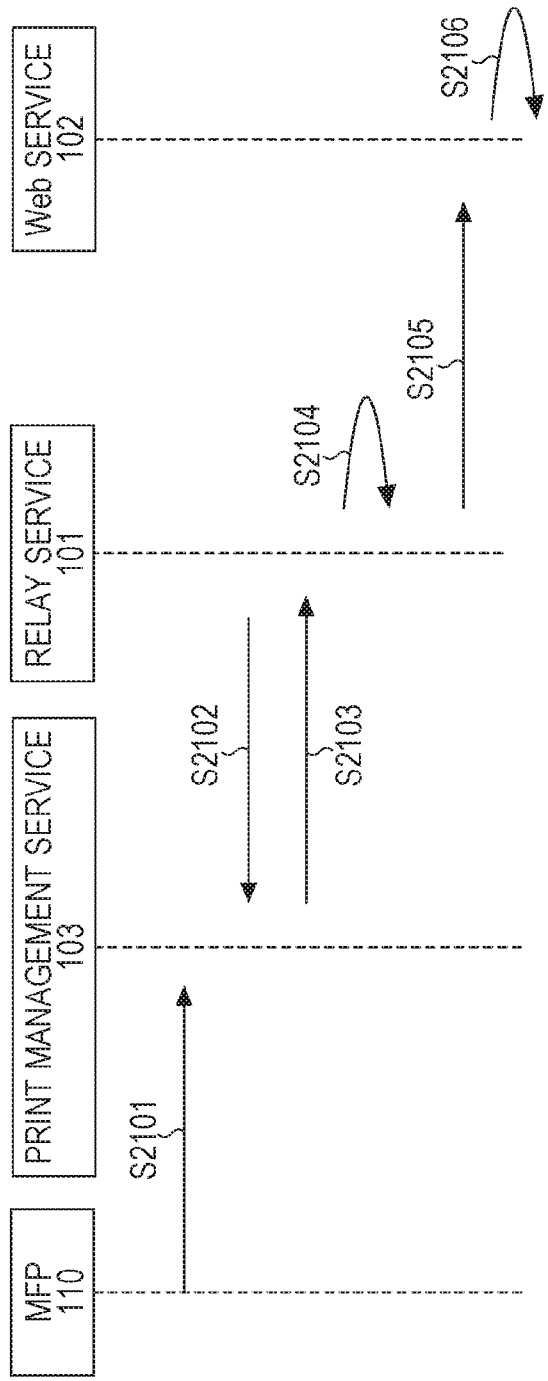
FIG. 21 is a sequence diagram until a trigger is activated and an action is executed.

A flow of specific processings will be described with reference to FIG. 21. The MFP 110 periodically notifies the amount of its remaining ink to the print management service 103 (S2101). The print management service 103 manages the amount of remaining ink of the MFP 110. The relay service 101 inquires to the print management service 103 about whether the trigger is activated (S2102). Specifically, the relay service 101 accesses the print management service 103 by use of the access token or refresh token for the print management service 103 saved in S509. The relay service 101 then transmits the trigger information "whether remaining ink of printer reduces" and the user information for the relay service 101.

The print management service 103 specifies the user A by the access using the access token. Subsequently, the print management service 103 confirms the amount of remaining ink of the MFP 110 registered for the user A. The amount of remaining ink corresponds to the information transmitted from MIT 110 in S2101. Here, when determining that the amount of remaining ink of any color (cyan in the present embodiment) of the MFP 110 is 20% or less, the print management service 103 determines that the trigger is activated. The print management service 103 then returns the trigger activation information indicating that the amount of remaining cyan ink is 20% or less, and the user information for the relay service 101 to the relay service 101 (S2103).

When receiving the trigger activation information indicating that the trigger is activated, the relay service 101 searches the action information associated with the relevant trigger registered by the user A by use of the user information for the relay service 101 returned in S2103 (S2104). Here, the relay service 101 searches the action information "order ink."

The relay service 101 accesses the Web service 102 by use of the access token for the Web service 102 managed in association with the user information for the relay service 101. The relay service 101 then transmits the order information indicating to order the cyan ink in the predetermined action format (S2105).

In S2106, the Web service 102 specifies the user A by the access token for the Web service 102, and specifies the information on the address managed in association with the user A. The Web service 102 then performs the processing of delivering the ink specified on the basis of the order information in S2005 to the above-specified user A. The Web service 102 may specify the ink to be delivered from the identification information of the MFP 110 and the order information by transmitting the identification information of the MFP 110 in S2103 and S2105.

The issue of the complicated operations caused in the ink order operation of the MFP 110 can be solved by the above processings. Further, even when the print management service 103 and the Web service 102 cannot directly exchange information, the user can appropriately order an ink of the MFP 110.

Other Embodiments

The different contents from the triggers and actions described according to the above embodiments may be set in the relay service 101. Processing sets other than the contents described in FIG. 18 may be registered. For example, a processing set for the third speech recognition terminal C may be registered. Here, when the user terminal 1902 is close to a range where it can make short-range wireless communication with the speech recognition terminal C, the user terminal 1902 displays that the speech recognition terminal C has been found, and promotes the password to be input. When the user inputs the correct password, the user terminal 1902 automatically transmits the connection information of the access point (connection information (such as SSID and password) of the access point 1903 in the present embodiments) managed in association with the password. The speech recognition terminal C can make communication via the access point 1903 with the processing. A processing set using such a speech recognition terminal C may be included in FIG. 18.

Further, software (programs) for realizing the functions of the above embodiments is supplied to a system or apparatus via a network or various storage mediums and a computer in the system or apparatus reads and executes the programs so that embodiments of the present invention are realized. In this case, the programs, and the storage mediums storing the programs therein configure embodiments of the present invention.

According to embodiments of the present invention, it is possible to print desired contents in an easy operation.

Embodiment(s) of the present invention can also be realized by a computer of a system or apparatus that reads out and executes computer executable instructions one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-078711, filed. Apr. 16, 2018, which is hereby incorporated by reference herein in its entirety.

What is claimed is:

1. A printing system comprising:
a relay apparatus;

a print management apparatus; and
a printing apparatus,
wherein the relay apparatus includes:
- a display control unit configured to perform display processing to display a setting screen including at least a first option to perform print processing in a case where a photograph having a predetermined string is registered in a Web service and a second option to print game contents in response to a speech instruction in a predetermined phrase toward a speech recognition terminal;
- a first transmission unit configured to transmit information corresponding to a registered photograph to the print management apparatus based on an event being specified in a case where the first option is selected, wherein the event that is specified is registration of the photograph having the predetermined string in the Web service; and
- a second transmission unit configured to transmit an instruction to print the game contents to the print management apparatus in a case where the second option is selected and a speech instruction in a predetermined phrase spoken toward the speech recognition terminal is specified,
- wherein the display control unit and the first transmission unit and the second transmission unit are implemented by at least one processor of the relay apparatus, the print management apparatus which is different from the relay apparatus includes:
- a generation unit configured to generate print data of the registered photograph based on reception of the information corresponding to the registered photograph, and to generate print data on the basis of the game contents based on reception of the instruction to print the game contents,
- wherein the generation unit is implemented by at least one processor of the print management apparatus, and the printing apparatus includes:
- a print unit configured to acquire the generated print data and to perform a print processing,
- wherein the print unit is implemented by at least one processor of the printing apparatus.

2. The printing system according to claim 1,
wherein the relay apparatus displays a first print setting screen configured to receive a selected printing apparatus and a selected sheet size for printing an image in a case where the first option is selected, and
displays a second print setting screen configured to receive a selected printing apparatus, a selected sheet size, and a selected difficulty level of game contents for printing the game contents in a case where the second option is selected, and
the print management apparatus generates print data by use of a setting value set as a setting value of a predetermined item of print setting information by the first print setting screen and a default setting value corresponding to the first option as a setting value of another item of the print setting information, and causes a printing apparatus selected by the first print setting screen to print the generated print data in a case where the first option is selected, and
generates print data by use of a setting value set as a setting value of a predetermined item of print setting information by the second print setting screen, a default setting value corresponding to the second option as a setting value of another item of the print setting information, and game contents corresponding to a difficulty level selected on the second print setting screen, and causes a printing apparatus selected by the second print setting screen to print the generated print data in a case where the second option is selected.

3. The printing system according to claim 2,
wherein the predetermined item is a sheet size.

4. The printing system according to claim 2,
wherein the print management apparatus can generate at least first game contents corresponding to a first difficulty level and second game contents corresponding to a second difficulty level, and
generates print data on the basis of the generated first game contents in a case where the first difficulty level is selected on the second print setting screen, and generates print data on the basis of the generated second game contents in a case where the second difficulty level is selected on the second print setting screen.

5. The printing system according to claim 1,
wherein the print management apparatus generates print data on the basis of a font determined based on region identification information issued from the relay apparatus, and the game contents in a case where the second option is selected.

6. The printing system according to claim 1,
wherein the game contents are sudoku.

7. The printing system according to claim 1, wherein the predetermined string includes a hashtag.

8. The printing system according to claim 1,
wherein the relay apparatus further includes an inquiry unit configured to inquire of the Web service about whether the photograph having the predetermined string is registered, and
wherein the inquiry unit is implemented by the at least one processor of the relay apparatus.

9. A printing system comprising:
a print management apparatus; and
a printing apparatus,
wherein the print management apparatus includes:
- a communication unit configured to communicate with a relay apparatus which (1) performs display processing to display a setting screen including at least a first option to perform print processing in a case where a photograph having a predetermined string is registered in a Web service and a second option to print game contents in response to a speech instruction in a predetermined phrase toward a speech recognition terminal and (2) transmit information corresponding to a registered photograph to the print management apparatus based on an event being specified in a case where the first option is selected, wherein the event is registration of the photograph having the predetermined string in the Web service and (3) transmit an instruction to print the game contents to the print management apparatus in a case where the second option is selected and a speech instruction in a predetermined phrase spoken toward the speech recognition terminal is specified, and
- a generation unit configured to generate print data of the registered photograph based on reception of the information corresponding to the registered photograph, and to generate print data on the basis of the game contents based on reception of the instruction to print the game contents, wherein the communication unit and the generation unit are implemented by at least one processor of the print management apparatus, wherein the print management apparatus is different from the relay apparatus, wherein the printing apparatus includes:
a print unit configured to acquire the generated print data and to perform a print processing, and
wherein the print unit is implemented by at least one processor of the printing apparatus.

10. The printing system according to claim 9,
wherein the print management apparatus generates print data on the basis of a font determined based on region identification information issued from the relay apparatus, and the game contents in a case where the second option is selected.

11. The printing system according to claim 9,
wherein the game contents are sudoku.

* * * * *